United States Patent [19]
Mayer et al.

[11] Patent Number: 5,399,191
[45] Date of Patent: Mar. 21, 1995

[54] COMPOSITIONS FOR THE IMPREGNATION OF MINERAL BUILDING MATERIALS

[75] Inventors: Hans Mayer, Burghausen; Wilhelm Kammerbauer, Marktl; Ingeborg König-Lumer, Burghausen, all of Germany

[73] Assignee: Wacker-Chemie GmbH, Munich, Germany

[21] Appl. No.: 143,592

[22] Filed: Nov. 1, 1993

[30] Foreign Application Priority Data

Dec. 16, 1992 [DE] Germany .......... 42 42 445.3

[51] Int. Cl.⁶ .................................. C09D 183/08
[52] U.S. Cl. ............................... 106/287.11
[58] Field of Search .................... 106/287.11

[56] References Cited

U.S. PATENT DOCUMENTS

| | | | |
|---|---|---|---|
| 4,125,673 | 11/1978 | Roth et al. | 428/447 |
| 4,661,551 | 4/1987 | Mayer et al. | 524/379 |
| 4,716,051 | 12/1987 | Rödder | 427/136 |
| 4,968,727 | 11/1990 | Watanabe et al. | 523/212 |
| 5,091,002 | 2/1992 | Schamberg et al. | 106/2 |
| 5,196,054 | 3/1993 | Schmuck et al. | 106/287.11 |
| 5,314,533 | 5/1994 | Goebel et al. | 106/287.11 |

FOREIGN PATENT DOCUMENTS

| | | |
|---|---|---|
| 0101816 | 12/1985 | European Pat. Off. . |
| 0186847 | 7/1986 | European Pat. Off. . |
| 337478 | 10/1989 | European Pat. Off. . |
| 0392253 | 10/1990 | European Pat. Off. . |
| 2128652 | 1/1976 | Germany . |
| 2526287 | 9/1982 | Germany . |
| 3447636 | 7/1986 | Germany . |

OTHER PUBLICATIONS

Database WPI, Section Ch, Week 0291 Derwent Publications Ltd. London (Nov. 1990).

*Primary Examiner*—David Brunsman
*Attorney, Agent, or Firm*—Martin Connaughton

[57] ABSTRACT

Compositions for the impregnation of mineral building materials, which comprise
  (A) salts of organic or inorganic acids and an organopolysiloxane siloxane or mixture of organopolysiloxanes containing SiC-bonded radicals containing basic nitrogen, in amounts of at least 0.5% by weight, based on the weight of the organopolysiloxane, optionally
  (B) an organosilicon compound containing basic nitrogen, in amounts of 0 to 0.5% by weight, based on the weight of the organosilicon compound, and
  (C) a fluorine-containing organic or organosilicon compound.

9 Claims, No Drawings

COMPOSITIONS FOR THE IMPREGNATION OF MINERAL BUILDING MATERIALS

FIELD OF INVENTION

The invention relates to compositions and methods for impregnation of mineral building materials, in particular for water-repellent, oil-repellent and efflorescence-preventing impregnation.

Background Art

Numerous attempts have been made to render mineral building materials water-repellent and oil-repellent and to prevent the formation of pale, bloom-like discolorations, which are called efflorescence. Troublesome white stains which render the corresponding component unusable for applications in a visible area occur in particular on freshly de-shuttered concrete which has not yet set or fiber cement which has not yet set and which is stored in the presence of moisture immediately after production. This efflorescence must then be removed with effort. Reference is made in this context to, for example, DE-B-21 28 652 (Michoud et al., published on May 22, 1975), which discloses a process for cleaning and sealing concrete buildings in which the concrete surface is first cleaned with a mixture of formic acid, hydroxyethylamine and aluminum triformate and then impregnated. Furthermore, water repellent treatment of high-density concrete with the aid of organosilicon compounds containing alkoxy groups is described in EP 101 816 B (Dynamit Nobel; published on Dec. 18, 1985) and corresponding U.S. Pat. No. 4,716,051, issued Dec. 19, 1987 and in EP 392 253 A (Th. Goldschmidt AG; published on Oct. 17, 1990) and corresponding U.S. Pat. No. 5,091,002, issued Feb. 25, 1992, and fluorine chemicals are disclosed in DE 25 26 287 C (Wacker-Chemie GmbH; published on Sep. 30, 1982) and corresponding U.S. Pat. No. 4,125,673 issued on Nov. 14, 1978 as oil- and stain-repellent agents.

Summary of the Invention The invention relates to compositions for the impregnation of mineral building materials, which comprise (A) a salt of an organic or inorganic acid and organopolysiloxane containing SiC-bonded radicals containing basic nitrogen in amounts of at least 0.5% by weight, based on the weight of the organopolysiloxane, optionally (B) an organosilicon compound containing basic nitrogen, in amounts of 0 to 0.5% by weight, based on the weight of the organosilicon compound, and (C) a fluorine-containing organic or organosilicon compound.

The term "basic nitrogen" as used in this invention defines total nitrogen in the respective silicone compounds of (A) and (B).

The organopolysiloxanes from which constituent (A) of the composition according to the invention is obtainable by reaction with an organic or inorganic acid. These reaction products are preferably of the formula

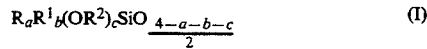

in which R can be identical or different and denotes hydrogen or monovalent, SiC-bonded organic radicals which are free from basic nitrogen, $R^1$ can be identical or different and denotes monovalent, SiC-bonded radicals containing basic nitrogen, $R^2$ can be identical or different and denotes hydrogen atoms or monovalent organic radicals, a is 0, 1, 2 or 3, b is 0, 1, 2 or 3 and c is 0, 1, 2 or 3, with the proviso that the sum of a, b and c is less than or equal to 3 and the radical $R^1$ is present in an amount of more than 0.5% by weight of basic nitrogen per organopolysiloxane molecule.

The radicals R are preferably optionally substituted hydrocarbon radicals having 1 to 20 carbon atoms, with hydrocarbon radicals having 1 to 8 carbon atoms, in particular the methyl and the isooctyl radical, being particularly preferred.

Preferably, a hydrocarbon radical, in particular a methyl radical, is also bonded to each silicon atom onto which a hydrogen atom is bonded.

The radicals $R^1$ are preferably those of the formula

in which $R^3$ can be identical or different and denotes hydrogen or a monovalent hydrocarbon radical which is optionally substituted by amino groups and $R^4$ denotes a divalent hydrocarbon radical.

The radical $R^3$ is preferably the aminoethyl radical.

Preferably, at least one hydrogen atom is bonded to each nitrogen atom in the radicals of formula (II).

The radical $R^4$ are preferably divalent hydrocarbon radicals having 1 to 10 carbon atoms, preferably 1 to 4 carbon atoms, in particular the n-propylene radical.

Examples of radicals $R^1$ are $H_2N(CH_2)_3-$, $H_2N(CH_2)_2NH(CH_2)_2-$, $H_2N(CH_2)_2NH(CH_2)_3-$, $H_2N(CH_2)_2-$, $H_3CNH(CH_2)_3-$, $C_2H_5NH(CH_2)_3-$, $H_3CNH(CH_2)_2-$, $C_2H_5NH(CH_2)_2-$, $H_2N(CH_2)_4-$, $H_2N(CH_2)_5-$, $H(NHCH_2CH_2)_3-$, $C_4H_9NH(CH_2)_2NH(CH_2)_2-$, cyclo-$C_6H_{11}NH(CH_2)_3-$, cyclo-$C_6H_{11}NH(CH_2)_2-$, $(CH_3)_2N(CH_2)_3-$, $(CH_3)_2N(CH_2)_2-$, $(C_2H_5)_2N(CH_2)_3-$ and $(C_2H_5)_2N(CH_2)_2-$.

The radicals $R^1$ are preferably $H_2N(CH_2)_3-$ and $H_2N(CH_2)_2NH(CH_2)_3-$, $H_2N(CH_2)_2NH(CH_2)_3-$ being particularly preferred.

The radicals $R^1$ can also be cyclic amine radicals, such as piperidyl radicals.

The radicals $R^2$ are preferably hydrogen atoms and alkyl radicals having 1 to 4 carbon atoms, the methyl, ethyl and propyl radical being preferred.

The average value of a is 0 to 2, preferably 0 to 1.8. The average value of b is 0.1 to 0.6, preferably 0.15 to 0.30 and the average value of c is 0 to 0.8, preferably 0.01 to 0.6.

Examples of organopolysiloxanes comprising units of formula (I) are the reaction product of tetraethyl silicate with N-(2-aminoethyl)-3-aminopropyltrimethoxysilane having a viscosity of 6 to 7 mm$^2$/s (25° C.) and an amine number of 2.15 (siloxane i), the reaction product of α,w-dihydroxydimethylpolysiloxane and N-(1-aminoethyl)-3-aminopropyltrimethoxysilane having a viscosity of 20 to 50 mm$^2$/s (25° C.) and an amine number of between 2.7 and 3.2 (siloxane ii) and the reaction product of $CH_3Si(OC_2H_5)_{0.8}O_{1.1}$ and N-(2-aminoethyl)-3-aminopropyltrimethoxysilane having a viscosity of 60 mm$^2$/s (25° C.) and an amine number of 2.15 (siloxane iii), (siloxane ii) and (siloxane iii) being preferred and (siloxane ii) being particularly preferred and the amine number corresponding to the number of ml of 1N HCl required to neutralize 1 g of substance.

The organopolysiloxanes comprising units of the formula (I) preferably have a viscosity of 6 to 60 mm²/s, at 25° C.

The organic or inorganic acids used for the preparation of constituent (A) of the impregnating agent according to the invention, can be the same as those which have been employed for the preparation of salts of an organic or inorganic acid and organopolysiloxane with SiC-bonded radicals containing basic nitrogen. Examples of such acids are HCl, H₂SO₄, acetic acid, propionic acid and diethyl hydrogen phosphate, acetic acid and propionic acid being preferred and acetic acid being particularly preferred.

The organopolysiloxane salt employed as component (A) can be an individual type of this salt or a mixture of at least two types of such a salt.

The organosilicon compound (B) employed preferably comprises units of formula

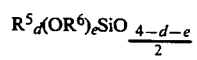     (III)

in which $R^5$ can be identical or different and denotes hydrogen or monovalent, SiC-bonded organic radicals, $R^6$ can be identical or different and denotes hydrogen atoms or monovalent organic radicals, d is 0, 1, 2, 3 or 4 and e is 0, 1, 2, 3 or 4, with the proviso that the sum of d+e is less than or equal to 4 and the content of basic nitrogen is 0 to 0.5% by weight, based on the weight of the particular organosilicon compound.

The radicals $R^5$ are preferably hydrocarbon radicals having 1 to 8 carbon atoms, the methyl and isooctyl radical being preferred.

The radicals $R^6$ are preferably the methyl, ethyl and propyl radical, the methyl and ethyl radical being preferred.

The organosilicon compound comprising units of formula (III) can be a silane where the sum of d+e is 4.

The organosilicon compounds comprising units of formula (III) can also be organopolysiloxanes where the sum of d+e is less than or equal to 3.

Examples of silanes of formula (III) are i-octyltrimethoxysilane and i-octyltriethoxysilane.

Examples of organopolysiloxanes comprising units of formula (III) are methylethoxypolysiloxanes, dimethylpolysiloxanes and i-octylmethoxypolysiloxanes.

The organopolysiloxanes comprising units of formula (III) preferably have a viscosity of 5 to 2000 mm²/s, and more preferably 10 to 500 mm²/m, in each case at 25° C.

The organosilicon compounds (B) employed are preferably silanes and low molecular weight siloxanes, in particular silanes.

If an organosilicon compound (B) is used for the preparation of the composition according to the invention, this is employed in amounts of 0.1 to 5 parts by weight, and more preferably 1.5 to 3 parts by weight, per part by weight of component (A).

The compositions according to the invention preferably comprise component (B).

The organosilicon compound (B) employed can be one type or a mixture of at least two types of such an organosilicon compound.

Compounds which can be employed as component (A) in the composition according to the invention and compounds which can be employed as component (B) in the composition according to the invention as well as mixtures of components (A) and (B) are already know. Reference may be made in this context to, for example, U.S. Pat. No. 4,661,551, issued Apr. 28, 1987 (Wacker-Chemie GmbH; published Apr. 28, 1984) and corresponding DE 34 47 636 A1 (published on Jul. 3, 1986).

The fluorine-containing organic compounds (C) are preferably polymeric compounds which consist of fluorine and carbon atoms and, if appropriate, chlorine, hydrogen, oxygen, sulfur, phosphorus and/or nitrogen atoms.

Examples of such fluorine compounds are polytetrafluoroethylene, copolymers of tetrafluoroethylene and hexafluoropropylene, polytrifluorochloroethylene, fluorourethane, copolymers of trifluorochloroethylene and other monomers, such as vinylidene fluoride, vinyl chloride, vinyl acetate or styrene; fluorinated acrylic resins, such as polymers of 1,1-dihydroperfluorobutyl acrylate and copolymers of n-butyl acrylate, N-methylolacrylamide and at least 35% by weight of a methacrylic acid ester of the formula

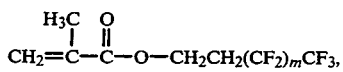

in which m is an integer having a value of from 1 to 13.

The fluorine-containing organic compounds are preferably fluorinated polyacrylates and polyurethanes.

The fluorine-containing organosilicon compounds (C) are preferably 3,3,3-trifluoro-n-propylmethylpolysiloxanes terminated with trimethylsilyl groups.

The fluorine-containing organic or organosilicon compound (C) employed according to the invention can be one type or a mixture of at least two types of such a compound.

The compositions according to the invention comprise constituent (C) in amounts of 0.1 to 50 parts by weight, preferably 1 to 5 parts by weight, per part by weight of constituent (A).

The fluorine-containing organic or organosilicon compound (C) is preferably employed as an aqueous dispersion, containing an organic solvent, or as a solution in an organic solvent.

The concentration of the fluorine-containing organic or organosilicon compounds in their dispersions or solutions is preferably in each case not more than 20% by weight, based on the total weight of the dispersion or solution.

Examples of the organic solvent which the aqueous dispersion of component (C) can contain or in which component (C) can be dissolved are ethylene glycol and butyl acetate. If an organic solvent is used for the preparation of the aqueous dispersions of (C), it is preferably one in which component (C) dissolves.

The dispersions and solutions of component (C) which are employed according to the invention can comprise other substances such as preservatives and dispersing agents, in addition to the fluorine-containing organic or organosilicon compound, water and organic solvent.

Fluorine-containing organic compounds and dispersions and solutions thereof are already known. Reference may be made in this context to, for example, the DE 25 26 287 C cited above.

Fluorine-containing organosilicon compounds and dispersions and solutions thereof are already known.

The compositions according to the invention can comprise additives (D), for example, preservatives and dispersing agents.

If additives (D) are used for the preparation of the composition according to the invention, these are employed in amounts of from 0.1 to 1.0 part by weight, and more preferably from 0.1 to 0.5 part by weight, per part by weight of component (A).

The composition according to the invention has a pH of preferably 4 to 7, and more preferably 5.

The composition according to the invention comprises water in amounts of 5 to 50 parts by weight, and more preferably 20 to 40 parts by weight, per part by weight of component (A).

The composition according to the invention can be prepared by any desired mixing of the components employed according to the invention. This is preferably effected by mixing the organopolysiloxane comprising units of formula (I) with the organic or inorganic acid to form constituent (A) and with the other constituents. This mixing is preferably carried out at a temperature of 20° to 120° C. under a pressure of 900 to 1100 hPa.

The compositions according to the invention have the advantage of having a water-repellent and oil-repellent and also efflorescence-preventing action, in particular on moist substrates, into which solvent-containing compositions do not penetrate and usually form glossy coatings.

The mineral building materials which can be impregnated with the compositions according to the invention are preferably alkaline mineral building materials, in particular those which comprise a hydraulic binder which has not yet reacted, such as free lime. This is in general the case for building materials which have not yet aged and in which the free lime is not completely carbonized.

Examples of alkaline mineral building materials are freshly de-shuttered concrete, masonry, compositions prepared from Portland cement and fiber cement slabs, preferably fresh concrete.

Furthermore, the present invention relates to a process for the impregnation of mineral building materials, in particular alkaline mineral building materials, which comprises applying the composition according to the invention onto the surface to be impregnated.

The compositions according to the invention can be applied in any desired manner, for example, by spraying, pouring, brushing, rolling or dipping.

In the process according to the invention, 100 to 500 g, and preferably 300 to 500 g, of the composition are applied per $m^2$ of surface to be impregnated.

The process has the advantage that water repellency, oil repellency and efflorescence prevention are achieved in a very simple and effective manner.

The building materials impregnated according to the invention have the advantage that they have water-repellent and oil-repellent properties and at the same time show no formation of white stains (efflorescence).

In the examples which follow, all the parts and percentage data relate to the weight, unless stated otherwise. Unless stated otherwise, the examples are carried out under ambient pressure about 1000 hPa, and at room temperature of about 20° C., or at a temperature which is established when the reactants are brought together at room temperature without additional heating or cooling. All the viscosity data given in the examples are intended to relate to a temperature of 25° C.

Example 1

(a) Preparation of a mixture of a salt of an organic or inorganic acid and an organopolysiloxane containing basic nitrogen (component A) and an organosilicon compound (component B).

27 parts of an α,w-dihydroxy[dimethyl/methyl-N-(2-aminoethyl)-3-aminopropyl]polysiloxane having an average molecula weight of about 4000 g/mol and a basic nitrogen content of 2.0%, based on the weight of the siloxane, 7 parts of glacial acetic acid, 50 parts of isooctyltrimethoxysilane, 15 parts of tetraethyl orthosilicate and 12 parts of an oligomeric mixture of monomethylsiloxane containing methoxy groups and monoisooctylsiloxane having an average molecular weight of about 400 g/mol are mixed with one another.

To prepare the impregnating agent, 10 parts of the mixture described above are mixed with 15 parts of a fluorine polymer dispersion comprising 30% of fluorourethane, 10% of ethylene glycol, 60% of water and <1% of ethyl acetate (commercially obtainable under the name Scotchgard FX-3567 from 3M Deutschland GmbH, D-4040 Neuss) and 75 parts of water. A stable, milky dispersion which shows no phase separation even after storage for 24 hours results.

A mixture of 1350 g of standard sand, 200 g of cement and 140 g of water is tamped into circular shuttering molds and left to stand for 6 hours and the shuttering is then removed. 400 $g/m^2$ of impregnating agent are then applied to the resulting amber-brown circular concrete specimens 2.0 cm thick and 8.5 cm in diameter by brushing and the specimens are left to stand for 24 hours. In each case 3 ml of distilled water are then applied to a circular concrete specimen at intervals of 24 hours. The water remains on the concrete surface and evaporates off in the air, no formation of white stains (efflorescence) being observed.

Example 2

To prepare the impregnating agent, 10 parts of the mixture described in Example 1(a) are mixed with 15 parts of a 30% strength fluoroacrylate dispersion (commercially obtainable under the name Scotchgard FC-393 from 3M Deutschland GmbH, D-4040 Neuss) and 75 parts of water. A milky, stable dispersion which shows no phase separation even after storage for 24 hours results. 400 $g/m^2$ of impregnating agent as described in Example 1, are then applied to the amber-brown circular concrete specimens, by brushing and the specimens are left to stand for 24 hours. In each case 3 ml of distilled water are then applied to a circular concrete specimen at intervals of 24 hours. The water remains on the concrete surface and evaporates off in the air, no formation of white stains (efflorescence) being observed.

Example 3

(b) Preparation of a mixture of a salt of an organic or inorganic acid and an organopolysiloxane containing basic nitrogen (component A) and an organosilicon compound (component B).

31 parts of an α,w-dihydroxy[dimethyl/methyl-N-(2-aminoethyl)-3-aminopropyl]polysiloxane having an average molecular weight of about 4000 g/mol and a content of basic nitrogen of 2.6%, based on the weight of the siloxane, 8 parts of glacial acetic acid, 27 parts of isooctyltrimethoxysilane, 12 parts of polyethyl silicate having an-average molecular weight of 450 g/mol and a viscosity of 4 $mm^2/s$ and 23 parts of an oligomeric mixture of monomethylsiloxane containing methoxy groups and monoisooctylsiloxane having an average molecular weight of about 400 g/mol are mixed with one another.

To prepare the impregnating agent, 15 parts of a fluorine polymer dispersion comprising 30% of fluorourethane, 10% of ethylene glycol, 60% of water and <1% of ethyl acetate (commercially obtainable under the name Scotchgard FX-3567 from 3M Deutschland GmbH, D-4040 Neuss) are mixed with 75 parts of water, and 10 parts of the mixture described in (b) above, are added to this emulsion. A milky, stable dispersion which shows no phase separation even after storage for 24 hours results.

400 g/m² of impregnating agent as described in Example 1, are applied to the amber-brown circular concrete specimens by brushing and the specimens are left to stand for 24 hours. In each case 3 ml of distilled water are then applied to a circular concrete specimen at intervals of 24 hours. The water remains on the surface of the concrete and evaporates off, no formation of white stains (efflorescence) being observed.

Example 4

To prepare the impregnating agent, 10 parts of the mixture described in Example 3(b) are mixed with 15 parts of a 30% strength fluoroacrylate dispersion (commercially obtainable under the name Scotchgard FC-393 from 3M Deutschland GmbH, D-4040 Neuss) and 75 parts of water. A milky, stable dispersion which shows no phase separation even after storage for 24 hours.

400 g/m² of impregnating agent as described in Example 1, are then applied to the amber-brown circular concrete specimens, by brushing and leaving the specimens standing for 24 hours. In each case 3 ml of distilled water are then applied to a circular concrete specimen at intervals of 24 hours. The water remains on the surface of the concrete and evaporates off, no formation of white stains (efflorescence) being observed.

Comparison Example 1

A mixture of 1350 g of standard sand, 200 g of cement and 140 g of water is tamped into circular shuttering molds and left to stand for 6 hours, after which the shuttering is then removed. The amber-brown circular concrete specimens 2.0 cm thick and 8.5 cm in diameter are left to stand for 24 hours. 3 ml of distilled water are then applied to a circular concrete specimen. The water penetrates immediately. After 24 hours, severe formation of white stains (efflorescence) is observed.

Comparison Example 2

10 parts of the mixture prepared in Example 3(b) above are poured into 90 parts of water. After stirring, a transparent mixture with a particle size of 30 nm results.

400 g/m² of this impregnating agent prepared in Example 1, is then applied to the amber-brown circular concrete specimens, by brushing and the specimens are left to stand for 24 hours. 3 ml of distilled water are then applied to a circular concrete specimen. The water remains on the surface of the concrete. After the water has evaporated off, severe formation of white stains (efflorescence) is found.

Comparison Example 3

17 parts of the fluorine polymer dispersion described in Example 1 are mixed with 83 parts of water.

400 g/m² of this impregnating agent, described in Example 1, are then applied to the amber-brown circular concrete specimens by brushing and the specimens are left to stand for 24 hours. 3 ml of distilled water are then applied to a circular concrete specimen. The water remains on the surface of the concrete for one hour, penetrating completely. After 24 hours, severe formation of white stains (efflorescence) is found.

What is claimed is:

1. A composition for the impregnation of mineral building materials, which comprises
   (A) salts obtained by the reaction of
      (i) organic or inorganic acids, with
      (ii) an organopolysiloxane or mixture of organosiloxanes, wherein the organosiloxane(s) contain SiC-bonded radicals containing basic nitrogen, in amounts of at least 0.5% by weight, based on the weight of the organopolysiloxane(s),
   (B) optionally an organosilicon compound containing basic nitrogen, in amounts of 0% to 0.5% by weight, based on the weight of the organosilicon compound, and
   (C) a fluorine-containing organic or organosilicon compound.

2. A composition as claimed in claim 1, wherein the organopolysiloxane from which constituent (A) is obtainable by reaction with an organic or inorganic acid is one of formula

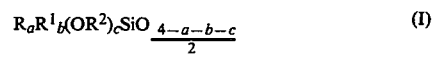

in which R can be identical or different and denotes hydrogen or monovalent, SiC-bonded organic radicals which are free from basic nitrogen, $R^1$ can be identical or different and denotes monovalent, SiC-bonded radicals containing basic nitrogen, $R^2$ can be identical or different and denotes hydrogen atoms or monovalent organic radicals, a is 0, 1, 2 or 3, b is 0, 1, 2 or 3 and c is 0, 1, 2 or 3, with the proviso that the sum of a, b and c is less than or equal to 3 and the radical $R^1$ is present in an amount of more than 0.5% by weight of basic nitrogen per organopolysiloxane molecule.

3. A composition as claimed in claim 1, wherein the organosilicon compound (B) is one comprising units of formula

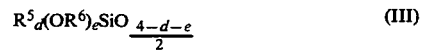

in which $R^5$ can be identical or different and denotes hydrogen or monovalent, SiC-bonded organic radicals, $R^6$ can be identical or different and denotes hydrogen atoms or monovalent organic radicals, d is 0, 1, 2, 3 or 4 and e is 0, 1, 2, 3 or 4, with the proviso that the sum of d+e is less than or equal to 4 and the content of basic nitrogen is 0 to 0.5% by weight, based on the weight of the particular organosilicon compound.

4. A composition as claimed in claim 1, wherein the organosilicon compound (B) is employed in amounts of 0.1 to 5 parts by weight per part by weight of component (A).

5. A composition as claimed in claim 1, wherein the fluorine-containing organic or organosilicon compound (C) is employed in amounts of 0.1 to 50 parts by weight per part by weight of constituent (A).

6. A composition as claimed in claim 5, wherein the fluorine-containing organic or organosilicon compound (C) is employed as an aqueous dispersion which optionally contains an organic solvent.

7. A composition as claimed in claim 5, wherein the fluorine-containing organic or organosilicon compound (C) is employed as a solution in an organic solvent.

8. A process for the impregnation of mineral building materials, which comprises applying a composition as claimed in claim 1 to the surface to be impregnated.

9. The process as claimed in claim 8, wherein the mineral building materials are alkaline mineral building materials.

* * * * *